(12) United States Patent
Modi

(10) Patent No.: US 8,635,341 B2
(45) Date of Patent: Jan. 21, 2014

(54) TERMINATION CRITERIA IN SERVICE DISCOVERY REQUEST

(75) Inventor: Vipul A. Modi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1099 days.

(21) Appl. No.: 12/030,955

(22) Filed: Feb. 14, 2008

(65) Prior Publication Data
US 2009/0210530 A1 Aug. 20, 2009

(51) Int. Cl.
*G06F 15/173* (2006.01)

(52) U.S. Cl.
USPC ............ 709/226; 709/223; 709/224; 709/225

(58) Field of Classification Search
USPC ........ 707/100; 709/203, 104.1, 328, 223–226
See application file for complete search history.

(56) References Cited

U.S. PATENT DOCUMENTS

| | | | |
|---|---|---|---|
| 2003/0140119 A1* | 7/2003 | Acharya et al. | ............... 709/219 |
| 2005/0102353 A1* | 5/2005 | Murphy et al. | ............... 709/203 |
| 2005/0193099 A1* | 9/2005 | Reus et al. | ..................... 709/220 |
| 2005/0246717 A1 | 11/2005 | Poole et al. | |
| 2006/0161563 A1* | 7/2006 | Besbris et al. | ................ 707/100 |
| 2006/0242322 A1 | 10/2006 | Williams et al. | |
| 2006/0265720 A1 | 11/2006 | Cai et al. | |
| 2006/0271699 A1 | 11/2006 | Lee et al. | |
| 2007/0033261 A1 | 2/2007 | Wagner et al. | |
| 2007/0050493 A1 | 3/2007 | Sienel et al. | |
| 2007/0136236 A1 | 6/2007 | Kussmaul et al. | |
| 2007/0153812 A1 | 7/2007 | Kemp | |
| 2007/0162586 A1 | 7/2007 | Kim | |
| 2007/0225865 A1 | 9/2007 | Moorer et al. | |
| 2008/0294776 A1* | 11/2008 | Ding | ............................ 709/226 |

FOREIGN PATENT DOCUMENTS

EP 1835417 A1 9/2007

OTHER PUBLICATIONS

Web Services Dynamic Discovery (WS-Discovery) (13 pages) http://www.cs.helsinki.fi/u/chande/courses/cs/MWS/reports/JenniKanniainen_WSDiscovery.pdf.
A Framework for the Deployment of Adaptable Web Service Compositions (4 pages) http://www.springerlink.com/content/6825801774vuq788/.
Microsoft Releases Revised Version of Web Services Dynamic Discovery (WS-Discovery) (6 pages) http://xml.coverpages.org/ni2004-10-29-a.html.
http://specs.xmlsoap.org/ws/2005/04/discovery/ws-discovery.pdf (42 pages).

* cited by examiner

*Primary Examiner* — Brian P Whipple
(74) *Attorney, Agent, or Firm* — Workman Nydegger

(57) ABSTRACT

The expression of search termination criteria in service discovery requests. When a client is to make a service discovery request, the client includes the service criteria that the service can use to verify whether they provide a matching service. However, the client also includes search termination criteria that specifies the criteria that the client will use to terminate the request. When deciding whether or not to send a response to the service discovery request, the service may elect not to send a response to the service discovery request if its logic determines that there is reduced chance that the response would be received by the client prior to the client terminating the request.

18 Claims, 6 Drawing Sheets

TERMINATION CRITERIA IN SERVICE DISCOVERY REQUEST

BACKGROUND

A computing network comprises a number of computing systems that are capable of communicating one with another. The Internet is an example of the largest network, but there are often smaller networks such as corporate networks, Local Area Networks (LANs) and so forth. Each network will offer a number of services to other nodes in the network. To take advantage of those services, a network node first discovers at least some of the services that are available. One particular discovery mechanism is to first optionally identify the type or scope of service needed, and then dispatch a service discovery request. The services that are able to provide the service then respond to the discover request.

For instance, Web Services (often abbreviated as WS) is a comprehensive collection of specifications that permits a robust interaction of computing services employed in a network environment. The most relevant WS specification as pertaining to service discovery requests is called WS-Discovery.

The WS-Discovery defines a discovery protocol to locate web services. Specifically, according to this protocol, a client (which may itself be a service in a different context) constructs a Probe request that specifies the type of service and/or the scope of service desired. The client then transmits (perhaps multicasts) the Probe request throughout the network.

According to this protocol, the services receive the Probe request, and then each determines whether or not they provide a service that satisfies the type and/or scope criteria specified in the Probe request. If the service satisfies the specified criteria, the service sends a ProbeMatch response representing a search result back to the client.

The client terminates the search operation after getting a certain number of results or after a certain time duration. Any ProbeMatch search results that are received after the client terminates the search operation are discarded by the client. A connectionless protocol (such as User Datagram Protocol (UDP)) is used for the search operation. Accordingly, the service does not know whether or not the search has terminated or not. Thus, the service sends the ProbeMatch response at the time the service determines that the service satisfies the criteria specified in the Probe request.

BRIEF SUMMARY

Embodiments described herein relate to the expression of search termination criteria in service discovery requests. When a client is to make a service discovery request, the client includes the service criteria that the service can use to verify whether they provide a matching service. However, the client also includes search termination criteria that specifies the criteria that the client will use to terminate the request. When deciding whether or not to send a response to the service discovery request, the service may elect not to send a response to the service discovery request if its logic determines that there is reduced chance that the response would be received by the client prior to the client terminating the request.

Accordingly, there may be a reduced number of futile responses to service discovery requests corresponding to searches that have been terminated anyway. This can make more efficient usage of network bandwidth. Furthermore, this can also relieve services of constructing responses to service discovery requests when it is more likely that such responses will not be used by the client in making a selection of a service.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, search termination criteria are specified in a service discovery request. After evaluating the search termination criteria, the service may elect not to send a response to the service discovery request even if it otherwise satisfies the service criteria specified in the service discovery request.

Figure 1A:
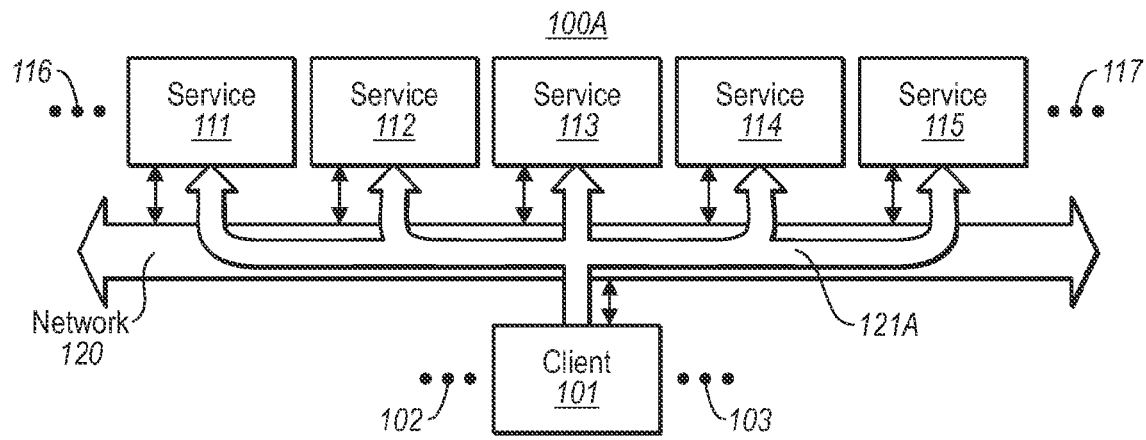
FIG. 1A illustrates a network environment in which a client may send a service discovery request to multiple services.
Figure 1B:
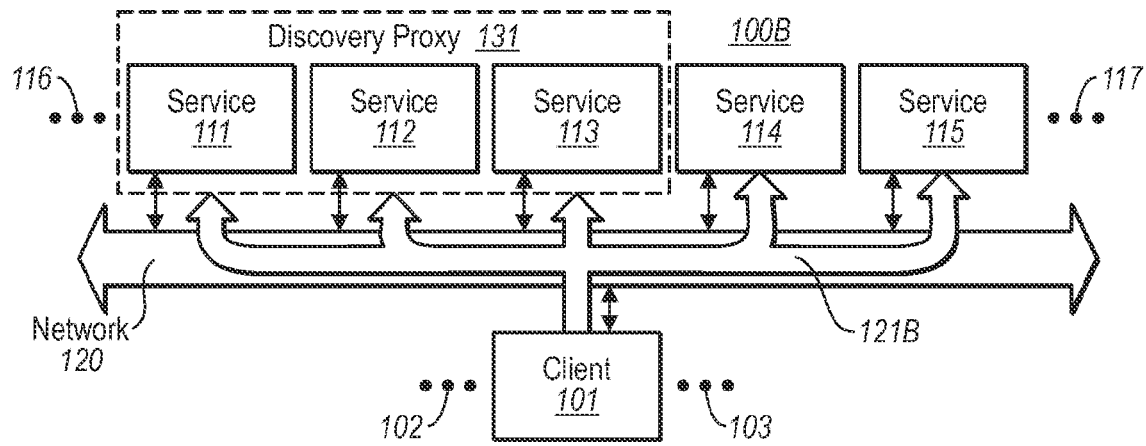
FIG. 1B illustrates a network environment as in FIG. 1A, except with some of the services being supported by a discovery proxy.
Figure 1C:
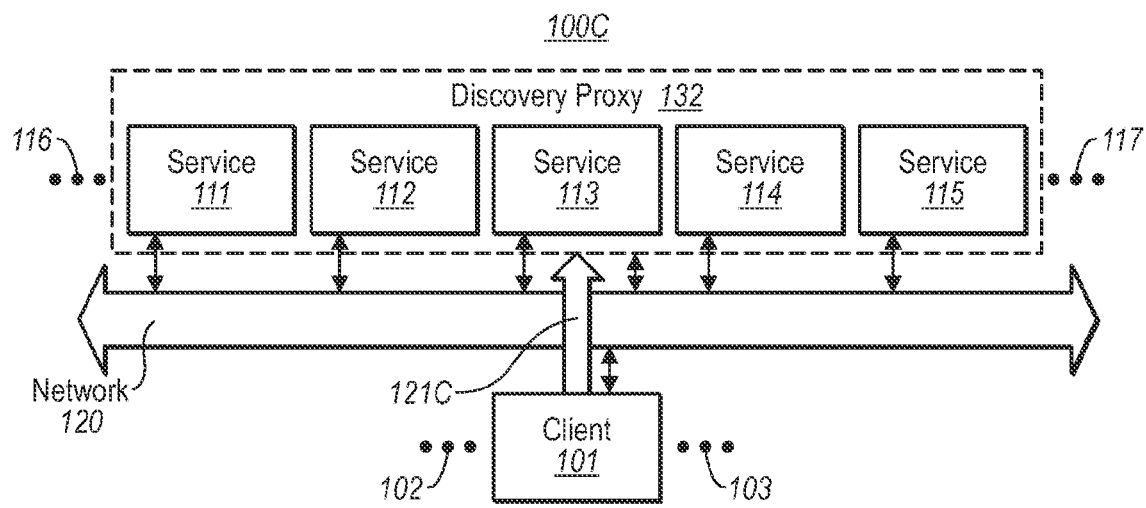
FIG. 1C illustrates a network environment as in FIG. 1A, except with all of the services being supported by a discovery proxy.

FIG. 1A through 1C each illustrate a respective network environment 100A through 100C. In each network environment, there is a client 101 and five services 111 through 115 connected to the client 101 and potentially to each other via the network 120. However, there might be other clients in the network environment as represented in each of FIGS. 1A through 1C with the horizontal ellipses 102 and 103. Furthermore, there may be other numbers of service (greater or fewer) in the network environment as represented in each of FIGS. 1A through 1C with the horizontal ellipses 116 and 117. The client 101 may be any computing entity that is to discover services in the network environment. The services 111 through 115 may each be any computing entity that offers a service in the network environment. A computing entity may be a module, a collection if interconnected modules, an application, a collection of interconnected application, or a computing system, or any other entity that is conventionally thought of as being a service. Although the client 101 is described herein as discovering services, the client 101 may also itself act as a source for one or more services provided to the network environment.

In each of the network environments 100A through 100C, the client 101 issues one or more service discovery requests to the various services, and receives or one more responses back from the services. For instance, the client 101 may issue a WS-Discovery Probe request, and the services may respond with a WS-Discovery ProbeMatch response. WS-Discovery is a Web Services specification that describes a protocol for discovering services provided in a network environment. The latest version of the WS-Discovery protocol is dated April 2005. However, in the remainder of this description and in the claims, "WS-Discovery" includes the April 2005 protocol, as well as any predecessor WS-Discovery protocol, and any successor protocol, whether called "WS-Discovery" in the industry or otherwise. Furthermore, a "WS-Discovery Probe" request is defined in this description and in the claims as being a service discovery request compliant with the WS-Discovery protocol (as defined herein). Finally, a "WS-Discovery ProbeMatch" request is defined in this description and in the claims as being any response compliant with the WS-Discovery protocol (as defined herein) to a service discovery request compliant with that same protocol.

In each of FIGS. 1A through 1C, each network environment has a different discovery proxy configuration. A discovery proxy acts on behalf of one or more services to response to service discovery requests. In FIG. 1A, for example, there is no discovery proxy used. Accordingly, each service 111 through 115 in FIG. 1A may receive a service discovery request (as represented by multi-headed arrow 121A), and each is responsible for evaluating the service discovery request, and returning a response if appropriate back to the client.

In FIG. 1B, services 111 through 113 are serviced by the discovery proxy 131, but services 114 and 115 are not. Accordingly, when the client 101 issues a multicast service discovery request (as represented by multi-headed arrow 121B), the services 114 and 115 are each still responsible for evaluating the request, and responding as appropriate. However, the discovery proxy 131 receives the service discovery request for the services 111 through 113, evaluates which of the services 111 through 113 satisfy the specified service criteria, and then responds for the services 111 through 113. In FIG. 1B, there are three service discovery requests shown as being received by the discovery proxy 131. In order to reduce network traffic, the discovery proxy 131 may register itself as a discovery service on the network and to the client, such that the client only sends one service discovery request to the discovery proxy 131.

In FIG. 1C, all of the services 111 through 115 are served by a discovery proxy 132. Any service discovery requests for any of the services 111 through 115 on the network are received not by the services themselves, but by the discovery proxy 132. The discovery proxy 132 then evaluates the service criteria in the service discovery request, evaluates which of the services provide that request, and then responds to the service discovery requests on behalf of the services 111 through 115. If the client knows about the universal discovery proxy 132 before the service discovery request is made, the client might perhaps just unicast the service discovery request to the universal discovery proxy as represented by the single-headed arrow 121C of FIG. 1C.

Figure 2:
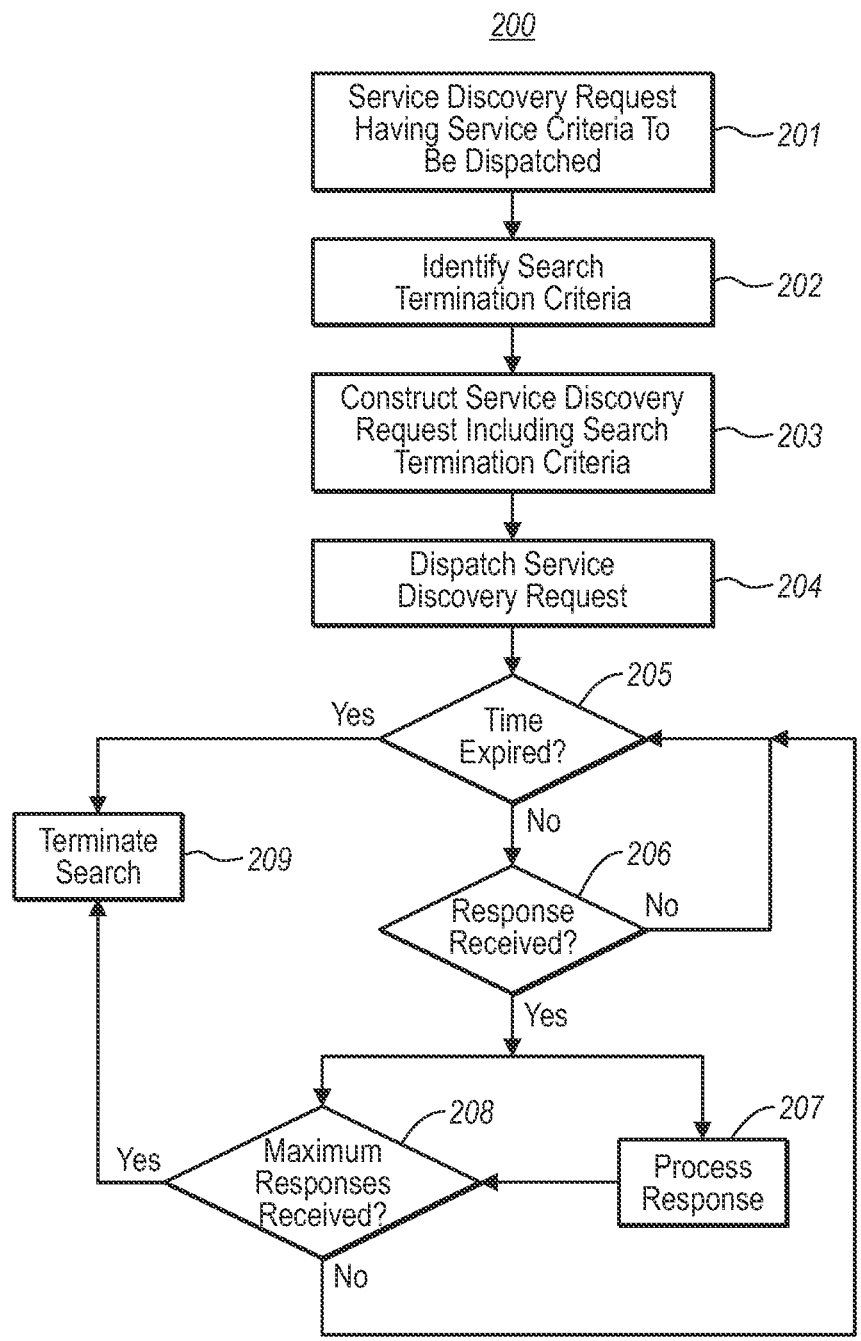
FIG. 2 illustrates a flowchart of a method for a client to discover a service using a service discovery request, and using search termination criteria in the request.

FIG. 2 illustrates a flowchart of a method 200 for discovering a service offered in a network environment. The method 200 may be performed by, for example, the client 101 in any network environment including those illustrated and described with respect to FIGS. 1A through 1C.

The method 200 may be initiated upon the client determining that a service discovery requested for a service satisfying service criteria is to be dispatched into the network environment (act 201). In preparation for dispatching the service discovery request, however, the client first identifies search termination criteria for the service discovery request (act 202). Although the determination that a service discovery request is to be sent (act 201) is shown in FIG. 2 as occurring before the identification of the search termination criteria (act 202), there is no dependency on timing between these two acts. For instance, the search termination criteria may be default value(s) set well in advance of the determination that a particular service discovery request is to be dispatched.

Figure 3:
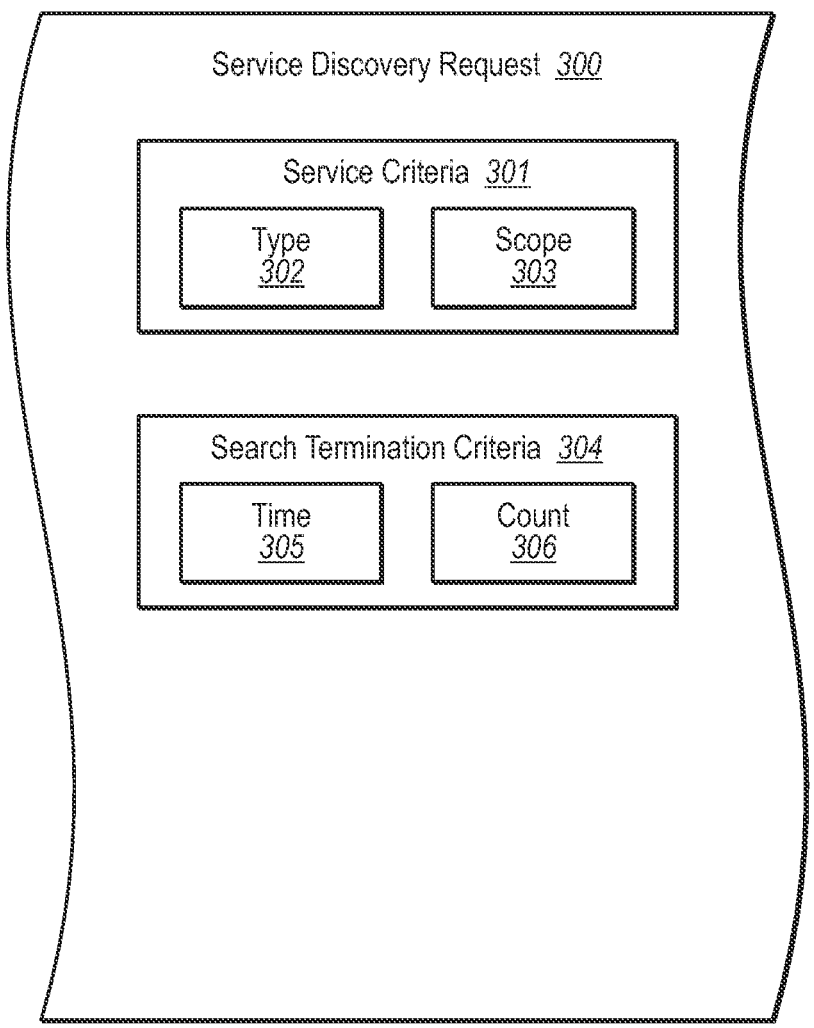
FIG. 3 schematically illustrates a data structure of a service discovery request including service criteria and search termination criteria.

The client then constructs the service discovery request (act 203) including service criteria as well as search termination criteria (act 203). FIG. 3 schematically illustrates a data structure of a service discovery request 300 that includes service criteria 301 and search termination criteria 304. The service criteria include data that the service may use to match itself against. For instance, the service criteria include a type of service 302 and/or a service scope 303. In conventional WS-Discovery Probe requests, service criteria may be set by type and/or scope.

The search termination criteria may include any criteria that a service might find helpful in evaluating whether a response will be considered by the client. For instance, the search termination criteria 304 is illustrated as including a time limit 305 that the service may use to determine whether or not it is likely to be able to generate and dispatch a response to the client in time for the client to actually use that response. In one example, perhaps the time limit 305 is a Coordinated Universal Time (UTC) which specifies and absolute time at which the search will be terminated by the client, and after which responses will not be considered. The time limit 305 might also include a relative time based on some event known to the service. For instance, the time limit may specify 5 seconds from the time that the service registers receipt of the request.

The search termination criteria also may include a count 306 indicating the maximum number of responses desired by the client. There may instead be some other information by which the service (in particular, the discovery proxy) may know that it should limit the number of responses to a particular number.

Although the precise structure of the service discovery request is not critical to the broader principles of the present invention, a particular example will now be provided. Specifically, the following illustrates a modified WS-Discovery Probe structure. First a particular schema is defined, and then an example probe request that follows that schema will be presented. To define the schema for the termination criteria, a WS-Discovery extension namespace uses the prefix "xd".

A particular schema example of a search termination criteria portion as expressed in XML Schema is as follows with line numbering added for clarity. The text "http" is replaced with "httq" and the text "www" is replaced with "yyy", in order not to actually have addressable Uniform Resource Identifiers (URIs) in the text of the patent application.

---

1. <?xml version="1.0" encoding="UTF-8"?>
2. <xs:schema
3.    targetNamespace="[URI for extended discovery namespace inserted here]"

```
4.      xmlns="[URI for extended discovery namespace inserted here]"
5.      xmlns:xs="http://yyy.w3.org/2001/XMLSchema"
6.      elementFormDefault="qualified"
7.      attributeFormDefault="unqualified">
8.      <xs:element name="MaxResults" type="xs:nonNegativeInteger">
9.         <xs:annotation>
10.           <xs:documentation>
11.              The maximum number of results the client is interested in
                 receiving.
12.           </xs:documentation>
13.        </xs:annotation>
14.     </xs:element>
15.     <xs:element name="SearchDurationInSeconds">
16.        <xs:annotation>
17.           <xs:documentation>
18.              The duration in seconds for which the client is willing to
                 wait for the responses before timing out the search
                 operation.
19.           </xs:documentation>
20.        </xs:annotation>
21.        <xs:complexType>
22.           <xs:simpleContent>
23.              <xs:extension base="xs:nonNegativeInteger">
24.                 <xs:attribute
25.                    name="StartTimeUtc"
26.                    type="xs:dateTime"
27.                    use="optional">
28.                    <xs:annotation>
29.                       <xs:documentation>
30.                          The UTC time at which the client initiated the
                             search operation.
31.                       </xs:documentation>
32.                    </xs:annotation>
33.                 </xs:attribute>
34.              </xs:extension>
35.           </xs:simpleContent>
36.        </xs:complexType>
37.     </xs:element>
38.  </xs:schema>
```

In this example, the target namespace for the new structure is specified in line 3, which will be referred to the prefix "xd" in the example that follows.

Lines 8-14 represent an element named "MaxResults" that specifies a maximum number of results the client is interested in receiving.

Lines 15-37 represent a complex element type called "SearchDurationInSeconds" that includes two portions, 1) the duration in seconds that the client is willing to wait for a response, and 2) The UTC time at which the client initiated the search operation.

The normative outline for a WS-Discovery Probe request with the termination criteria is as follows with line number added for clarity.

```
1.   <s:Envelope ... >
2.      <s:Header ... >
3.         <a:Action ... >
4.            http://schemas.xmlsoap.org/ws/2005/04/discovery/Probe
5.         </a:Action>
6.         <a:MessageID ... >xs:anyURI</a:MessageID>
7.         [<a:ReplyTo ... >endpoint-reference</a:ReplyTo>]?
8.         <a:To ... >xs:anyURI</a:To>
9.         ...
10.     </s:Header>
11.     <s:Body ... >
12.        <d:Probe ... >
13.           [<d:Types>list of xs:QName</d:Types>]?
14.           [<d:Scopes [MatchBy='xs:anyURI']? ... >
15.              list of xs:anyURI
16.           </d:Scopes>]?
17.           [<xd:MaxResults>xs:nonNegativeInteger</xd:MaxResults>]?
18.           [<xd:SearchDurationInSeconds
                 [StartTimeUtc='xs:dateTime']? ... >
19.              xs:nonNegativeInteger
20.           </xd:SearchDurationInSeconds>]?
21.           ...
22.        </d:Probe>
23.     </s:Body>
24.  </s:Envelope>
```

Lines 1-24 are the Simple Object Access Protocol (SOAP) envelope in its entirety. The header element extends from lines 2-10. The header specifies an action in lines 3-5 that represents that this is a WS-Discovery Probe request. Lines 12-22 in the body element represent a "Probe" element. While the SOAP envelope in its entirety might be considered a service discovery request, the probe element may also be considered a service discovery request. Line 13 represents an optional Types element defined by WS-Discovery and represents an example of the type field 302 of FIG. 3. Here, the client may elect to specify a type of service desired. Lines 14-16 represent an optional scope element that represent an example of the scope field 304 of FIG. 4. Here, the client may elect to specify a scope of the service desired. In WS-Discovery, one or both are specified in the probe request.

Line 17 is an embodiment of the optional MaxResults element defined in the schema. Here, the client may specify the maximum number of results desired as part of the search. Lines 18-20 is an embodiment of the optional SearchDurationInSeconds element in which the UTC time that the client initiated the search is specified as an attribute in line 18, and in which a time in seconds is specified at line 19.

Returning back to the method 200 of FIG. 2, once the service discovery request is constructed that includes the search termination criteria (act 203), the discovery request is caused to be dispatched to the services in the network environment (act 204). For instance, in the example network environment of FIG. 1A, each of the services 111 through 115 receives the service discovery request. In the example of FIG. 1B, the discovery proxy 131 receives one or more service discovery requests on behalf of services 111 through 113, while services 114 and 115 receive their own service discovery request. In the example of FIG. 1C, the discovery proxy 132 receives but a single service discovery request on behalf of all of the services 111 through 115.

The client then waits for a response. If time expires for the search results (Yes in decision block 205), then the search terminates (act 209) and the client will no longer use any service discovery responses received thereafter. This is true even if no service discovery responses are received at all. If a response is received while time has not yet expired (No in decision block 205, and yes in decision block 206), then the response is processed (act 207). If this additional response results in the maximum number of responses being received (Yes in decision block 208), then the search terminates, even if the search time has not yet expired. The maximum number of responses is configurable and may be as few as one, but may also be as many as unlimited.

Figure 4:
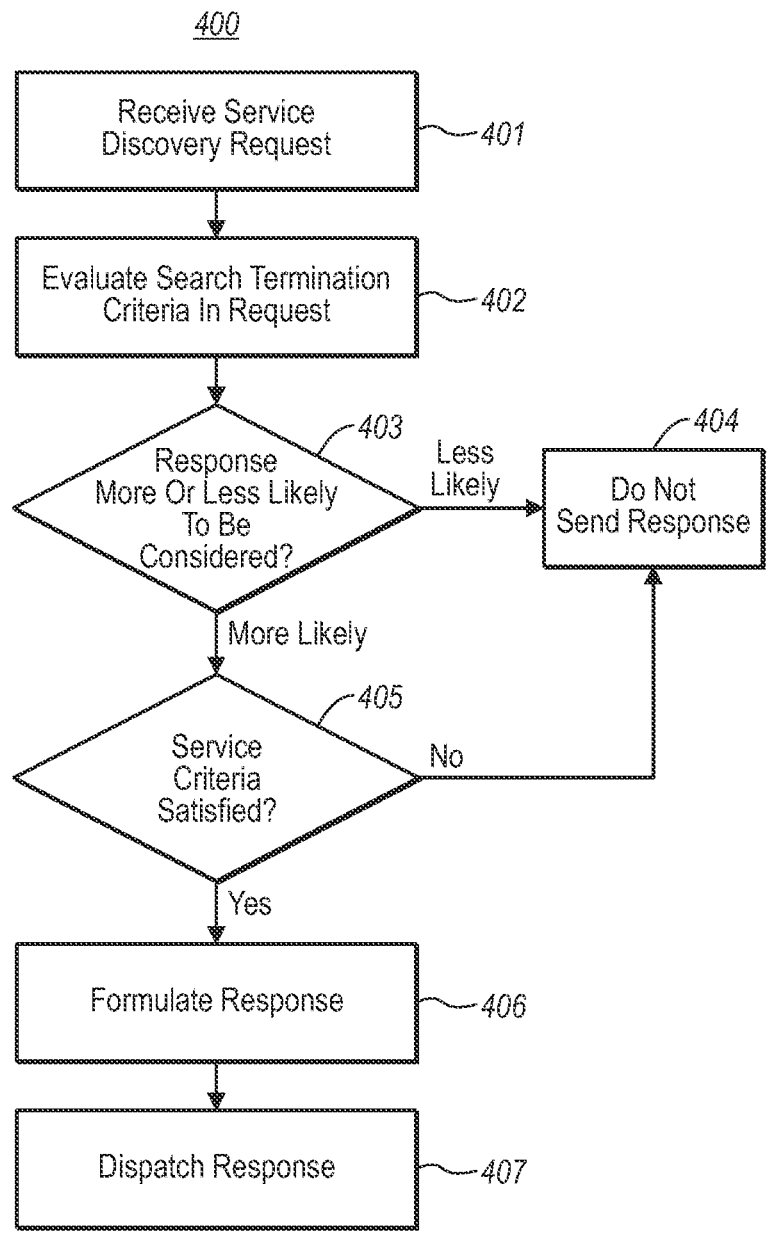
FIG. 4 illustrates a flowchart of a method for a service to handle a service discovery request.

FIG. 4 illustrates a flowchart of a method 400 for responding to a service discovery request. The method 400 is initiated upon receipt of a service discovery request (act 401). The service evaluates the search termination criteria included in the service discovery request (act 402). For example, if the service received the service discovery request 300 of FIG. 3, the search termination criteria might evaluate the search termination criteria 304. If the service received the example WS-Discovery Probe request in the example above, the service might parse the probe request, and evaluate the contents of the MaxResults element at line 17 and the SearchDurationInSeconds element at lines 18-20.

If the service has some way of knowing how many responses the client has already been received (at least at a minimum), the MaxResults element might be helpful in determining whether a response should be sent. However, if the service has no way of knowing how many responses are being received, the service may largely ignore the MaxResults element, and just evaluate the SearchDurationInSeconds element.

Based on this search termination criteria, the service then makes a decision about whether the client would even consider a potential response received from the o m service (decision block 403). For instance, if the service knows that the client has already received the maximum number of responses specified in the MaxResults element, the service determines that there is no chance that the client would consider a response generated by the service. Also, if the time limit for the search is going to expire in one second, and the service knows that it takes an average of three seconds (one three minutes for that matter) to generate a response, the service knows that it is not likely that the client would consider the response.

If the service determines that the response is less likely to be considered by the client ("Less Likely" in decision block 403), the service refrains from sending a response to the service discovery request (act 404) regardless of whether the service satisfies the service criteria specified in the service discovery request. By so doing, the service has avoided unnecessary processing resources used to evaluate the service criteria and generate a response, since the response is less likely to be considered by the client. The service has also avoided unnecessarily using network bandwidth transmitting a message that will ultimately not be used by its recipient.

If the service determines that the response is more likely to be considered by the client ("More Likely" in decision block 403), then the service further evaluates the message. In that case, the service might further evaluate the service criteria (decision block 405) to determine whether or not the service is a match to the service discovery request. For instance, the service might evaluate whether it offers the type of service specified in the scope specified in the service discovery request. If the service criteria does not match (No in decision block 405), then the service does not send a response to the service discovery request (act 404). On the other hand, if the service criteria does match (Yes in decision block 405), the response may be formulated (act 406) and dispatched to the client (act 407). For instance, if the request was a WS-Discovery Probe request, then the response might be a WS-Discovery ProbeMatch message.

Figure 5:
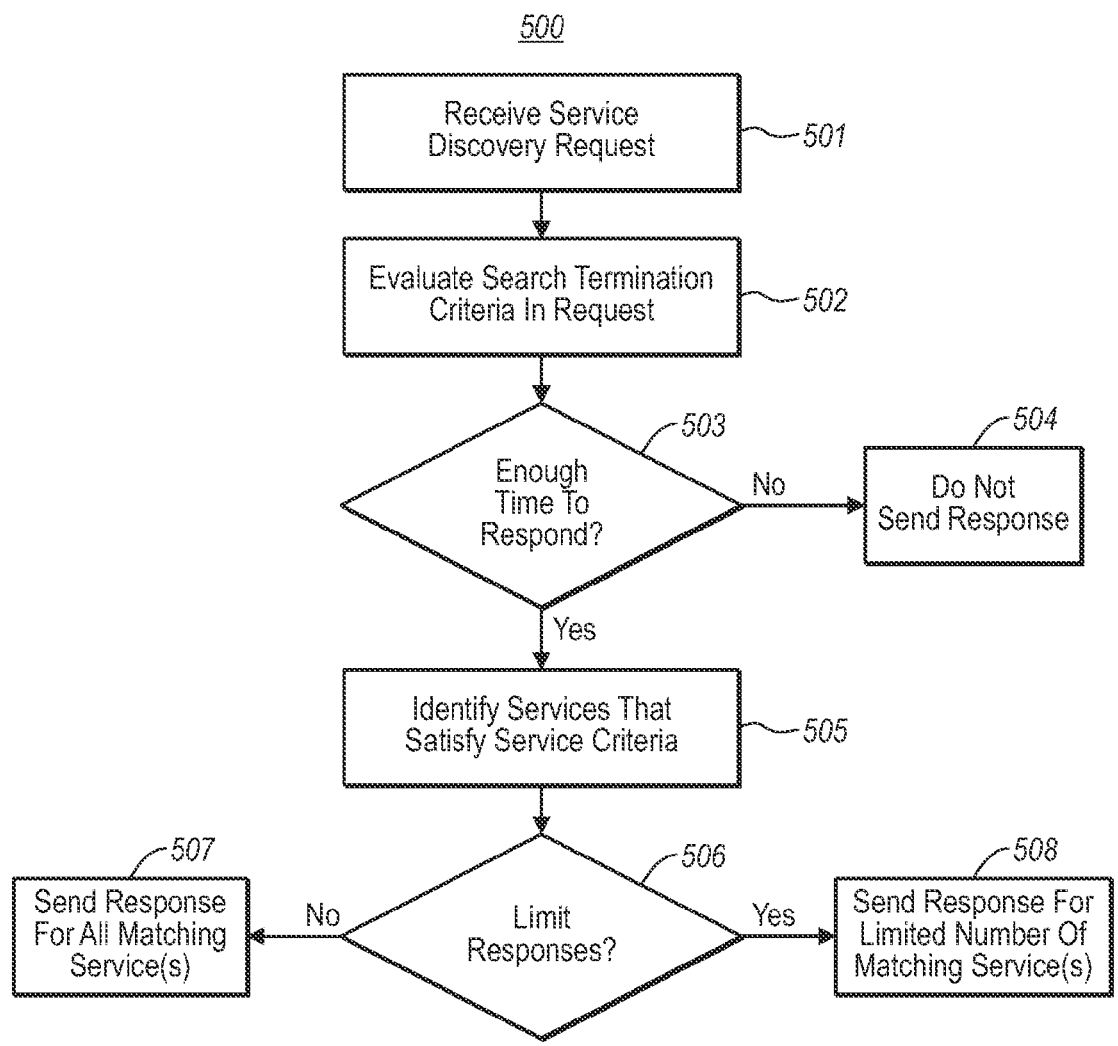
FIG. 5 illustrates a flowchart of a method for a discovery proxy to handle a service discovery request.

FIG. 5 is a flowchart of a method 500 for a discovery proxy to respond to a service discovery request on behalf of a plurality of services. FIG. 1B shows such a discovery proxy 131 acting as a proxy for some of the services in the network environment. FIG. 1C shows a discovery proxy service 132 that acts as a proxy for all of the service in the network environment. The discovery proxy responds to service discovery requests on behalf of the services that it acts as a proxy for.

Once again, the method 500 begins upon receipt of a service discovery request (act 501). The search termination criteria of the received request is then evaluated (act 502). If the search termination criteria specifies a time limit, the discovery proxy evaluates whether or not the discovery proxy can generate responses in time (decision block 503). If the discovery proxy determines that it does not have enough time to respond prior to the search termination, (No in decision block 503), the discovery proxy does not send any responses (act 504). On the other hand, if the discovery proxy determines that there is enough time (Yes in decision block 503), the discovery proxy further evaluates the service discovery request.

In particular, the discovery proxy evaluates the service criteria against some or all of the services that the proxy manages (act 505). If the search termination criteria expresses a limit to the number of responses, then the discovery proxy determines whether a limited number of responses should be returned (decision block 506). If there is no limit specified, then the discovery proxy evaluates potentially all of the services to find all matching services. The discovery proxy then sends a response for all of the services (act 507). If the number of responses is to be limited (Yes in decision block 506), then the discovery proxy can stop evaluating the services for matches against the service proxy once the maximum number of services for the request has been found. Alternatively, the discovery proxy may have some ranking mechanism for finding the best matches of the services to the service criteria. The discovery proxy then sends a restricted number of responses back to the client (act 508). For example, if all 5 of the services 111 through 115 of the discovery proxy 132 of FIG. 1C satisfied the service criteria, but the search termination criteria specified that only one response was needed, the discovery proxy 132 would send only one response back to the client 101.

Having described various embodiments with respect to FIGS. 1A through 5, a computing system that may implement one or more services or the client will now be described with respect to FIG. 6.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 6:
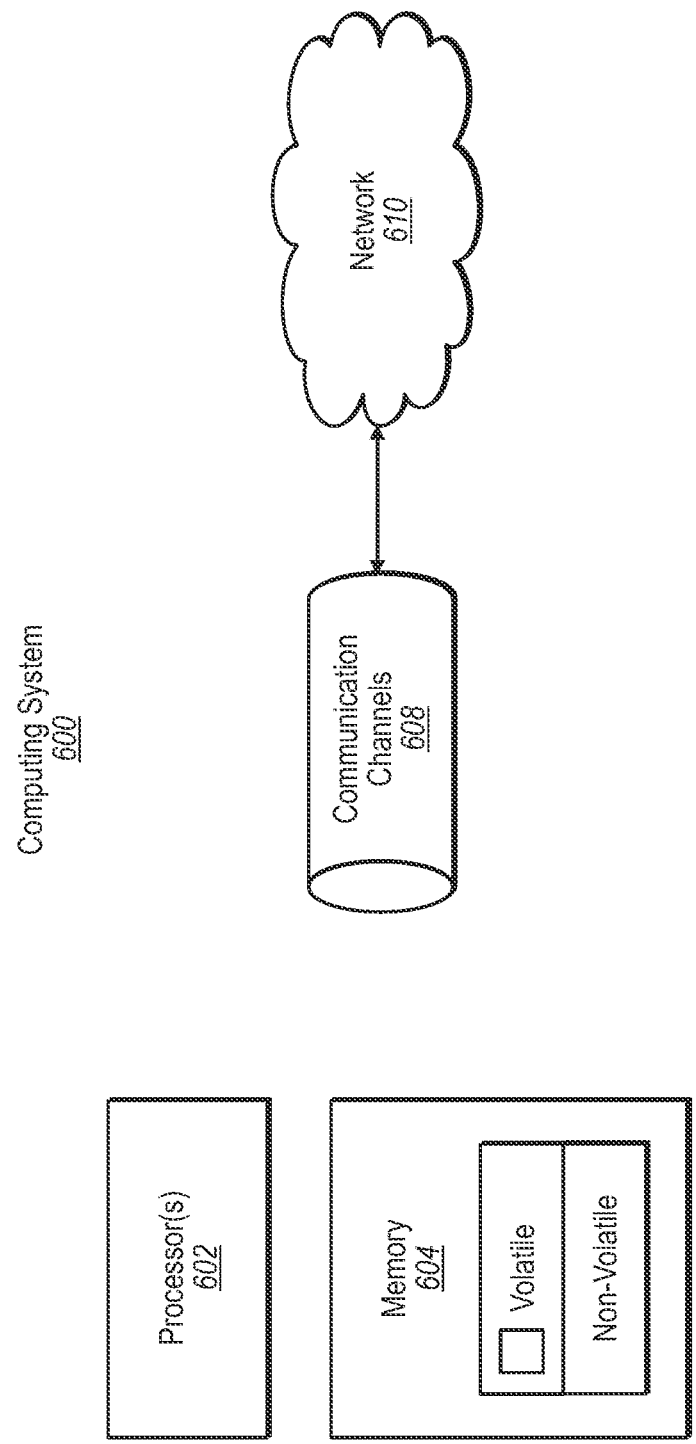
FIG. 6 illustrates an example computing system that may implement one or more service, or the client of FIGS. 1A through 1C.

Referring to FIG. 6, in its most basic configuration, a computing system 600 typically includes at least one processing unit 602 and memory 604. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 604 of the computing system 600.

Computing system 600 may also contain communication channels 608 that allow the computing system 600 to communicate with other computing systems over, for example, network 610. Communication channels 608 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for a client computing system discovering a service offered in a network environment, the method being implemented by the client computing system and comprising:
    an act of determining that a service discovery request for a service satisfying service criteria is to be dispatched to a plurality of service providers in the network environment, the plurality of service providers including:
        at least one discovery proxy that processes service discovery requests on behalf of a plurality of services; and
        at least one service that processes service discovery requests only on its own behalf;
    an act of identifying search termination criteria for the service discovery request, the search termination criteria including at least a specification of a limit to a maximum count of responses that will be considered by the client computing system, wherein the maximum count of responses that will be considered is used by any of the plurality of service providers that are able to determine how many responses to the service discovery request the client computing system has already received during processing of the service discovery request, but wherein the maximum count of responses is ignored by any of the plurality of service providers that are unable to determine how many responses the client computing system has received during processing of the service discovery request; and
    an act of constructing a service discovery request including the service criteria as well as the search termination criteria and dispatching the service discovery request to at least the plurality of service providers.

2. The computer-implemented method of claim 1, further comprising:
    an act of causing the service discovery request to be dispatched to the plurality of service providers in the network environment.

3. The computer-implemented method of claim 1, wherein the termination criteria specifies that the service discovery request is limited by time.

4. The computer-implemented method of claim 3, wherein the time is a relative time rather than an absolute time, the relative time being a time relative to an occurrence of an event.

5. The computer-implemented method of claim 1, wherein the service criteria includes at least one of a type of service or a scope of service.

6. The computer-implemented method of claim 1, wherein the service discovery request is a WS-Discovery probe request.

7. The computer-implemented method of claim 1, wherein the service discovery request is multicast.

8. A computer program product comprising one or more physical storage devices having stored thereon computer-executable instructions that, when executed by one or more processors of a computing system, cause the computing system to execute a service that is capable of performing a method for responding to a service discovery request, the method comprising the following in response to the detection of a service discovery request:
    an act of evaluating search termination criteria included in the service discovery request, the search termination criteria specifying a time-expiration for the service discovery request and a maximum count of responses that will be considered;
    an act of determining whether the service can determine how many responses have already been received, and ignoring the maximum count of responses that will be considered in the search termination criteria when it is determined that the service cannot determine how many responses have already been received;
    an act of determining whether the service can respond to the service discovery request before the time-expiration of the service discovery request occurs;

when it is determined based on the act of determining that the service is unable to respond to the service discovery request before the time-expiration occurs, an act of refraining from sending a response to the service discovery request regardless of whether the service satisfies the service criteria specified in the service discovery request;

when it is determined based on the act of determining that the service is able to respond to the service discovery request before the time-expiration occurs, performing the following:

an act of determining whether the service satisfies the service criteria specified in the service discovery request; and when it is determined that the service does satisfy the service criteria, an act of formulating and dispatching a response to the service discovery request.

9. The computer program product of claim 8, wherein the time-expiration is an absolute time.

10. The computer program product of claim 8, wherein the time-expiration is a relative time from an event whose time is known by the service.

11. The computer program product of claim 10, wherein the event is a registration of receipt time.

12. The computer program product of claim 8, wherein the response to the service discovery request is a WS-Discovery ProbeMatch request.

13. The computer program product of claim 8, wherein the response is structured as eXtensible Markup Language (XML).

14. A computing system comprising:

one or more processors; and one or more physical storage devices having stored thereon computer-executable instructions that, when executed by the one or more processors of a computing system, cause the computing system to execute a service that is capable of performing a method for responding to a service discovery request, the method comprising the following in response to the detection of a service discovery request:

an act of evaluating search termination criteria included in the service discovery request, the search termination criteria specifying a time-expiration for the service discovery request and a maximum count of responses that will be considered;

an act of determining whether the service can determine how many responses have already been received, and ignoring the maximum count of responses that will be considered in the search termination criteria when it is determined that the service cannot determine how many responses have already been received;

an act of determining whether the service can respond to the service discovery request before the time-expiration of the service discovery request occurs;

when it is determined based on the act of determining that the service is unable to respond to the service discovery request before the time-expiration occurs, an act of refraining from sending a response to the service discovery request regardless of whether the service satisfies the service criteria specified in the service discovery request;

when it is determined based on the act of determining that the service is able to respond to the service discovery request before the time-expiration occurs, performing the following:

an act of determining whether the service satisfies the service criteria specified in the service discovery request; and when it is determined that the service does satisfy the service criteria, an act of formulating and dispatching a response to the service discovery request.

15. The computer program product of claim 14, wherein the time-expiration is a relative time from an event whose time is known by the service.

16. The computer program product of claim 15, wherein the event is a registration of receipt time.

17. The computer program product of claim 14, wherein the response to the service discovery request is a WS-Discovery ProbeMatch request.

18. The computer program product of claim 14, wherein the response is structured as eXtensible Markup Language (XML).

* * * * *